(12) United States Patent
Kalargeros

(10) Patent No.: US 9,340,235 B2
(45) Date of Patent: May 17, 2016

(54) VEHICLE BONNET

(71) Applicant: Jaguar Land Rover Limited, Whitley Coventry Warwickshire (GB)

(72) Inventor: Nicolaos Kalargeros, Stratford Upon Avon (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/376,951

(22) PCT Filed: Feb. 6, 2013

(86) PCT No.: PCT/EP2013/052351
§ 371 (c)(1),
(2) Date: Aug. 6, 2014

(87) PCT Pub. No.: WO2013/117602
PCT Pub. Date: Aug. 15, 2013

(65) Prior Publication Data
US 2015/0001888 A1    Jan. 1, 2015

(30) Foreign Application Priority Data
Feb. 6, 2012  (GB) .................................. 1201970.9

(51) Int. Cl.
*B62D 25/00* (2006.01)
*B62D 25/12* (2006.01)
(Continued)

(52) U.S. Cl.
CPC .............. *B62D 25/12* (2013.01); *B62D 21/152* (2013.01); *B62D 25/105* (2013.01); *B62D 65/00* (2013.01); *Y10T 29/49826* (2015.01)

(58) Field of Classification Search
CPC ...... B62D 25/10; B62D 25/12; B62D 21/152; B62D 25/105; B62D 65/00
USPC ...................................................... 296/193.11
See application file for complete search history.

(56) References Cited

U.S. PATENT DOCUMENTS 7,631,928 B2 * 12/2009 Ackland et al. .......... 296/193.11
7,984,943 B2 * 7/2011 Iwano et al. ............. 296/193.11

FOREIGN PATENT DOCUMENTS

DE    102006015403 A1    10/2007
DE    102007053171 A1     5/2009
(Continued)

OTHER PUBLICATIONS

International Search Report for application No. PCT/EP2013/052351, dated Mar. 19, 2013, 5 pages.
(Continued)

*Primary Examiner* — Joseph D Pape
(74) *Attorney, Agent, or Firm* — Reising Ethington P.C.

(57) ABSTRACT

The present application relates to a motor vehicle bonnet (101). The bonnet (101) has an outer surface panel (109) and an inner panel (113). The outer surface panel (109) is joined to the inner panel (113) along an edge of said vehicle bonnet (101). A support panel (111) is provided between the inner panel (109) and the outer surface panel (113). The support panel (111) has a first joining section (123) and inner panel (113) has a second joining section (125). The first and second joining sections (123, 125) have complementary profiles which substantially match the profile of an adjacent section of the outer surface panel (109). The inner panel (113) diverges away from the outer surface panel (109) inset from the second joining section (125). The application also relates to a method of assembling a motor vehicle bonnet (101).

19 Claims, 10 Drawing Sheets

(51) Int. Cl.
  *B62D 25/10* (2006.01)
  *B62D 21/15* (2006.01)
  *B62D 65/00* (2006.01)

(56) References Cited

FOREIGN PATENT DOCUMENTS

| DE | 102008046910 A1 | 3/2010 |
| DE | 102009052152 A1 | 5/2011 |
| DE | 102010025877 A1 | 1/2012 |
| JP | H0272176 U | 6/1990 |
| JP | 11091627 A | 4/1999 |
| JP | 2003226264 A | 8/2003 |
| JP | 2003261070 A | 9/2003 |
| JP | 2006008048 A | 1/2006 |
| JP | 2006044544 A | 2/2006 |
| JP | 2008105497 A | 5/2008 |
| JP | 2008110668 A | 5/2008 |
| JP | 2008143417 A | 6/2008 |
| JP | 2008238881 A | 10/2008 |
| JP | 2008296796 A | 12/2008 |
| KR | 20020009835 A | 2/2002 |

OTHER PUBLICATIONS

UK Combined Search and Examination Report for corresponding application No. GB1201970.9, dated Jun. 3, 2012, 8 pages.
Further Search Report corresponding to application No. GB 1302108.4, dated Jan. 17, 2014, 5 pages.
Combined Search and Examination Report corresponding to application No. GB1302108.4, dated Jul. 9, 2013, 7 pages.
Japanese Office action corresponding to JP application No. 2014-556038, dated Sep. 29, 2015, 4 pages.

\* cited by examiner

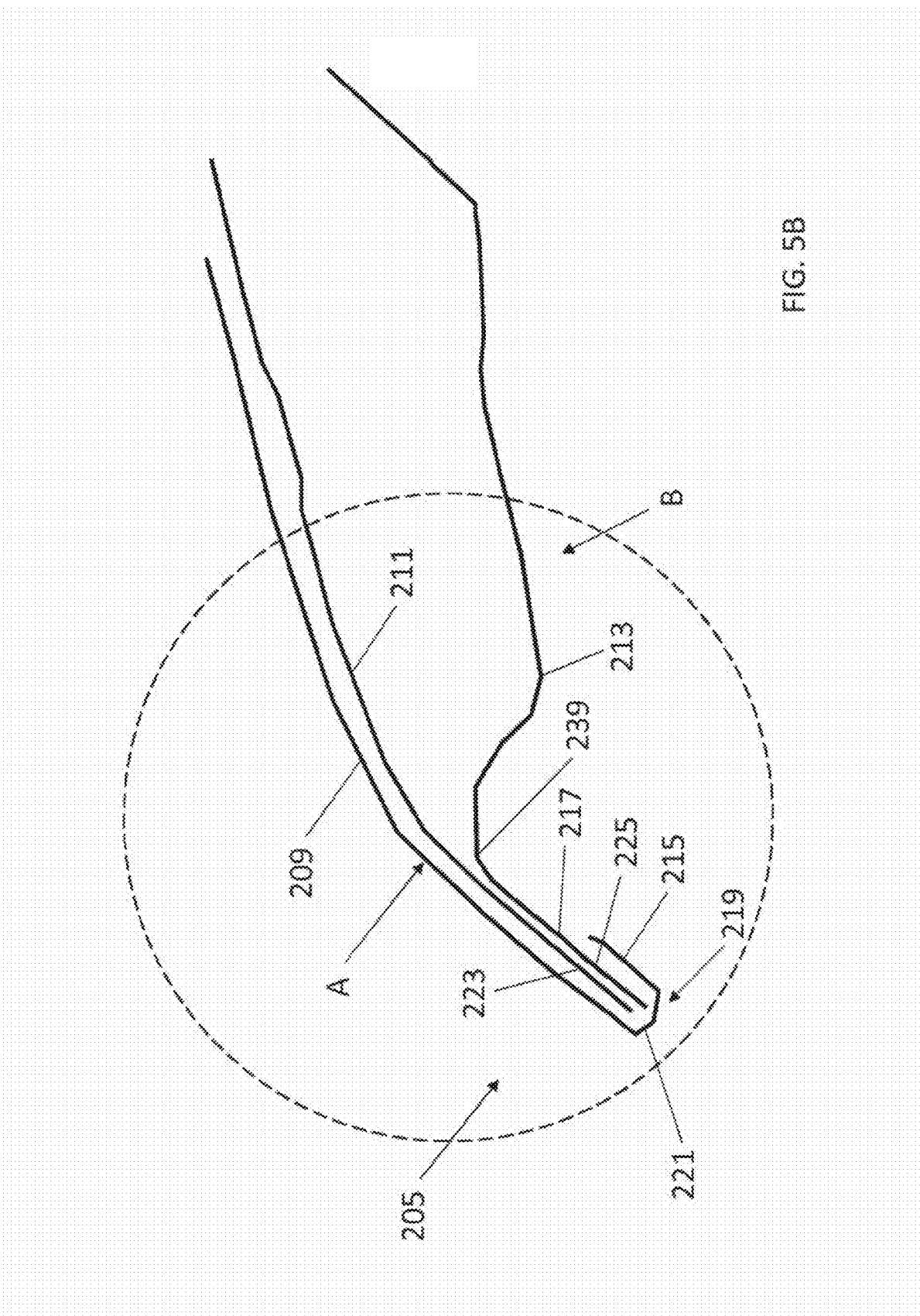

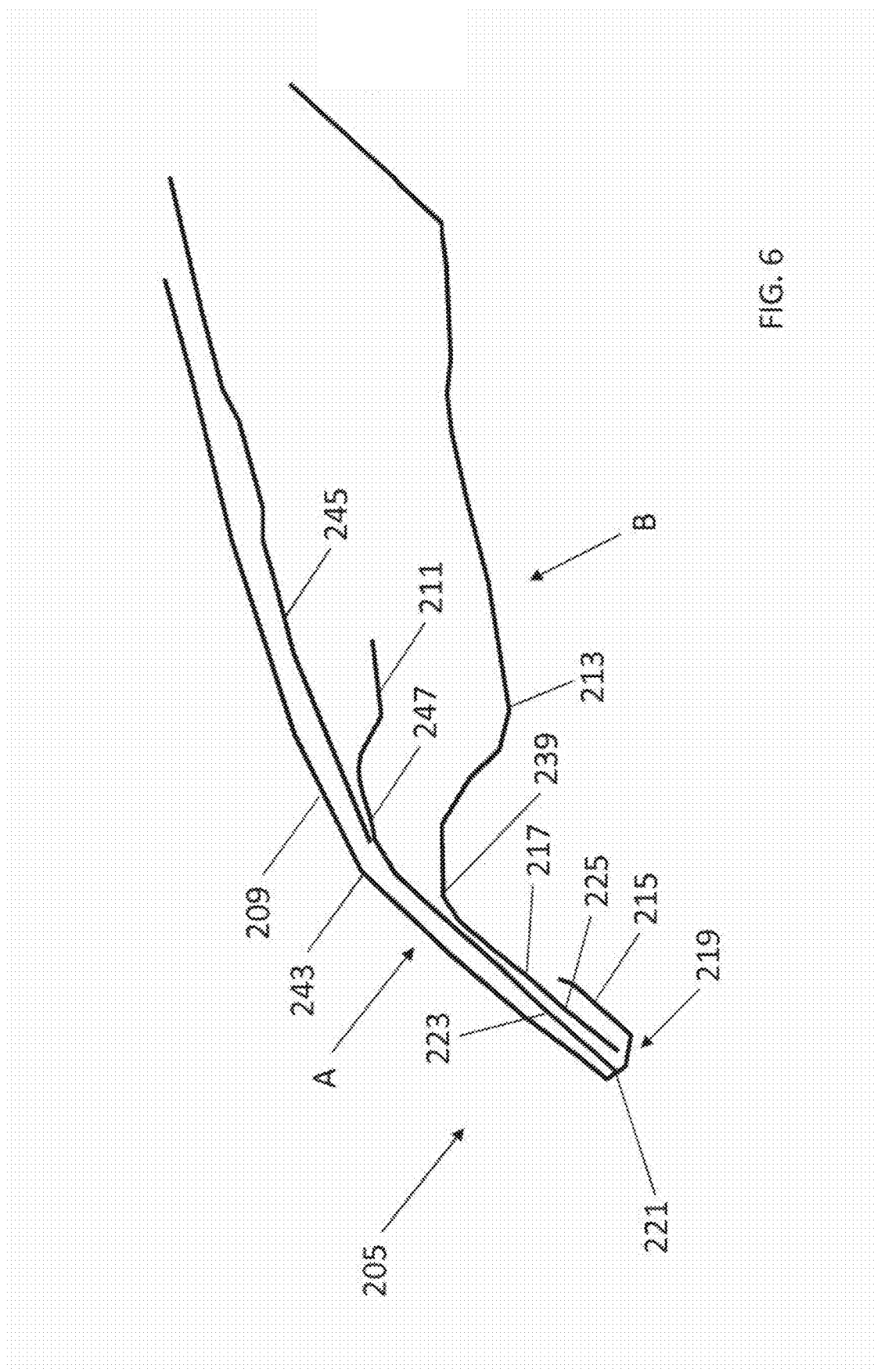

VEHICLE BONNET

TECHNICAL FIELD

The present invention relates to a vehicle body component and a method of assembling same. More particularly, the present invention relates to a motor vehicle bonnet.

BACKGROUND OF THE INVENTION

A known arrangement of a hood or bonnet 1 for a motor vehicle 3 is shown in FIGS. 1A, 1B and 2. The bonnet 1 comprises an outer surface panel 5 (omitted from FIG. 1 for clarity), an intermediate support panel 7, and an inner panel 9. The outer surface panel 5 defines the 'A' surface of the assembled bonnet 1 and the inner panel 9 defines the 'B' surface.

The front of the support panel 7 is bent to form a first flange 11 which contacts a first cooperating surface 13 formed on the inner panel 9. Mechanical fasteners (not shown), such as rivets, are inserted through apertures formed in the flange 11 and the cooperating surface 13 to mount the support panel 7 on the inner panel 9. A second flange 15 is provided at the front edge of the outer surface panel 5 and is bent around the inner panel 9 to form a hem 17. The hem 17 thereby connects the outer surface panel 5 and the inner panel 9.

To provide access during the assembly process, the first flange 11 and the cooperating surface 13 extend in a longitudinal direction offset angularly relative to the adjacent section of the outer surface panel 5, as shown in FIG. 2. This arrangement of the support panel 7 and the inner panel 9 can cause non-uniformity in the stiffness of the bonnet 1.

At least in preferred embodiments, the present invention improves over the prior art bonnet arrangements.

SUMMARY OF THE INVENTION

In a first aspect, the present invention relates to a motor vehicle bonnet comprising:
  an outer surface panel and an inner panel, the outer surface panel being joined to the inner panel along an edge of said vehicle bonnet; and
  a support panel provided between the inner panel and the outer surface panel;
  wherein the support panel comprises a first joining section and the inner panel comprises a second joining section, the first joining section and the second joining section having complementary profiles which substantially match the profile of an adjacent section of the outer surface panel;
  wherein, inset from said second joining section, the inner panel diverges away from the outer surface panel. Thus, beyond the second joining section, the inner panel diverges away from the outer surface panel. The inner panel can diverge away from the outer panel in a direction extending inwardly from the edge of the vehicle bonnet. The divergence of the inner panel can begin adjacent to or proximal to an inside edge of said second joining section. The divergence can occur progressively, for example by a continuous curve formed in said dinner panel. Alternatively, a fold line can be formed in the inner panel, inset from said second joining section, to initiate the divergence of said inner panel away from said outer surface panel. The fold line can define the inside edge of said second joining section.

The profile so the surfaces of the first joining section and the adjacent section of the outer surface panel are complementary. The arrangement according the present invention can help provide improved uniformity in the rigidity of the bonnet. The outer surface panel defines a 'A' surface of the bonnet, visible from the outside of the vehicle when the bonnet is in a closed position, and the inner panel defines a 'B' surface of the bonnet, typically defining an underside of the bonnet beneath the 'A' surface when the bonnet is closed. The support panel is an intermediate panel joined to the inner panel. The first joining section may be formed without steps and/or flanges.

The first and second joining sections can be disposed adjacent to the edge of the vehicle bonnet. The outer surface panel can form a hem folded over said inner panel and said support panel. In this arrangement, the hem can be bolded over said first and second joining sections. The first and second joining sections can be fixedly retained by said hem, thereby mounting the inner panel and the support panel to the outer surface panel. Alternatively, the outer surface panel can form a hem folded over said inner panel. The first and second joining sections can be inset from said hem.

The first and second joining sections can overlap each other and contact each other in a face-to-face arrangement. The first joining section can be suitable for joining the support panel to the inner panel. The first joining section can be fixedly mounted to the second joining section. For example, mechanical fasteners and/or adhesive can be used to join the first and second joining sections. In arrangements in which the outer surface panel forms a hem, the hem can join the support panel to the inner panel. In particular, the hem can join said first and second joining sections.

At least in certain embodiments, the profile of the first joining section and/or the second joining section can closely match the profile of the adjacent section of the outer surface panel. The first joining section and/or the second joining section can be arranged substantially parallel to the adjacent section of the outer surface panel. The support pan& could contact the outer surface panel. Alternatively, the support panel can be spaced apart from the outer surface pane. A substantially uniform gap can be maintained between the support panel and the outer surface panel. The gap can be maintained over the surface of the support member.

The outer surface panel defines an edge of the bonnet. The profile of the support panel and/or the inner panel can at least substantially match the profile of the outer surface panel in a direction extending away from the edge of the bonnet. The outer surface panel is joined to the inner panel along the edge of the bonnet. The edge can, for example, be a leading edge of the bonnet. The outer surface panel can define a hem which joins the outer surface panel to the inner panel. The hem can be formed by folding an edge flange over the inner panel and optionally applying an adhesive to bond the layers together.

The support panel can be releasably coupled to the inner panel and/or the outer surface panel remote from said first joining section. An adhesive, for an example an anti-flutter adhesive, can provide a suitable releasable coupling. By establishing a coupling which is non-structural, the outer surface panel, the support panel and the inner panel can provide alternate load paths to the bonnet mounting points (such as hinges and/or latches).

The inner panel can comprise a concave section adjacent the support panel. The concave section can be provided in the underside of the bonnet for accommodating tooling during assembly. The second joining section of the inner panel can define a portion of the concave section. A reinforcing panel can be provided on the inner panel. The reinforcing panel can overlie part or all of the concave region of the inner panel.

According to a yet further aspect of the present invention, there is provided a motor vehicle bonnet comprising:

an outer surface panel and an inner panel, the outer surface panel being joined to the inner panel along an edge of said vehicle bonnet; and a support panel provided between the inner panel and the outer surface panel;

the support panel comprising a first joining section and the inner panel comprising a second joining section, the first joining section and the second joining section having complementary profiles which substantially match the profile of an adjacent section of the outer surface panel;

wherein the outer surface panel forms a hem folded over said first and second joining sections, the inner panel and the support panel being fixedly retained by said hem. Inset from said second joining section, the inner panel can diverge away from the outer surface panel.

The motor vehicle bonnet described herein can be a clamshell-style bonnet.

In a further aspect of the present invention, there is provided a motor vehicle body component comprising:

an outer surface panel and an inner panel; and a support panel having a first joining section for joining the support panel to the inner panel;

wherein the inner panel has a stepped profile for accommodating the first joining section between the inner panel and the outer surface panel.

The stepped profile can comprise a z-shaped step formed in the inner panel. The z-shaped step can comprised a distal arm and a proximal arm offset from each other. The distal and proximal arms can be arranged substantially parallel to each other. The distal arm can be coupled to the outer surface panel. The proximal arm of the z-shaped step can be coupled to the support panel.

The body component can, for example, be a bonnet, a wing, a door assembly or a boot cover. The outer surface panel typically defines an outer surface of the vehicle.

According to a still further aspect of the present invention, there is provided a motor vehicle bonnet comprising:

an outer surface panel and an inner panel, the outer surface panel being joined to the inner panel along an edge of said vehicle bonnet; and a support panel provided between the inner panel and the outer surface panel;

the support panel comprising a first joining section and the inner panel comprising a second joining section, the first joining section and the second joining section having complementary profiles which substantially match the profile of an adjacent section of the outer surface panel.

wherein the outer surface panel forms a hem folded over said first and second joining sections, the inner panel and the support panel being fixedly retained by said hem.

According to a still further aspect of the present invention there is provided a method of assembling a motor vehicle bonnet comprising an outer surface panel, a support panel and an inner panel; the method comprising:

coupling the support panel to the inner panel; and coupling the inner panel to the outer surface panel;

wherein the support panel comprises a first joining section for joining the support panel to a second joining section of the inner panel, the first joining section and the second joining section having complementary profiles which substantially matches the profile of an adjacent section of the outer surface panel;

wherein, inset from said second joining section, the inner panel diverges away from the outer surface panel.

The method can include the additional step of forming a z-shaped step in the inner panel for receiving the support panel.

The support panel can be coupled to the inner panel before the inner panel is coupled to the outer surface panel. The inner panel can be coupled to the support panel by forming a hem along an edge thereof.

According to a still further aspect of the present invention, there is provided a motor vehicle bonnet comprising:

an outer surface panel and an inner panel; and a support panel provided between the inner panel and the outer surface panel;

wherein the support panel comprises a first joining section for joining the support panel to the inner panel, the first joining section of the support panel having a complementary profile which substantially matches the profile of an adjacent section of the outer surface panel.

According to a yet further aspect of the present invention there is provided a method of assembling a motor vehicle bonnet comprising an outer surface panel, a support panel and an inner panel; the method comprising:

coupling the support panel to the inner panel; and coupling the inner panel to the outer surface panel;

wherein the support panel comprises a joining section for joining the support panel to the inner panel, the joining section of the support panel being arranged substantially parallel with a corresponding section of the outer surface panel.

It will be appreciated that relative terms, such as inner, outer, upper, lower, top and bottom, are used herein to indicate the relative position/orientation of components in the assembled vehicle in a normal operating condition. Likewise, references to the front and back of components correspond to their orientation in relation to the front and back of the assembled vehicle.

BRIEF DESCRIPTION OF THE DRAWINGS

Embodiments of the present invention will now be described, by way of example only, with reference to the accompanying figures, in which:

FIGS. 5A and 5B show a longitudinal section of a second embodiment of the present invention; and FIG. 6 shows a longitudinal section of a moridifed version of the second embodiment shown in FIGS. 5A and 5B.

DETAILED DESCRIPTION OF AN EMBODIMENT

Figure 1A:
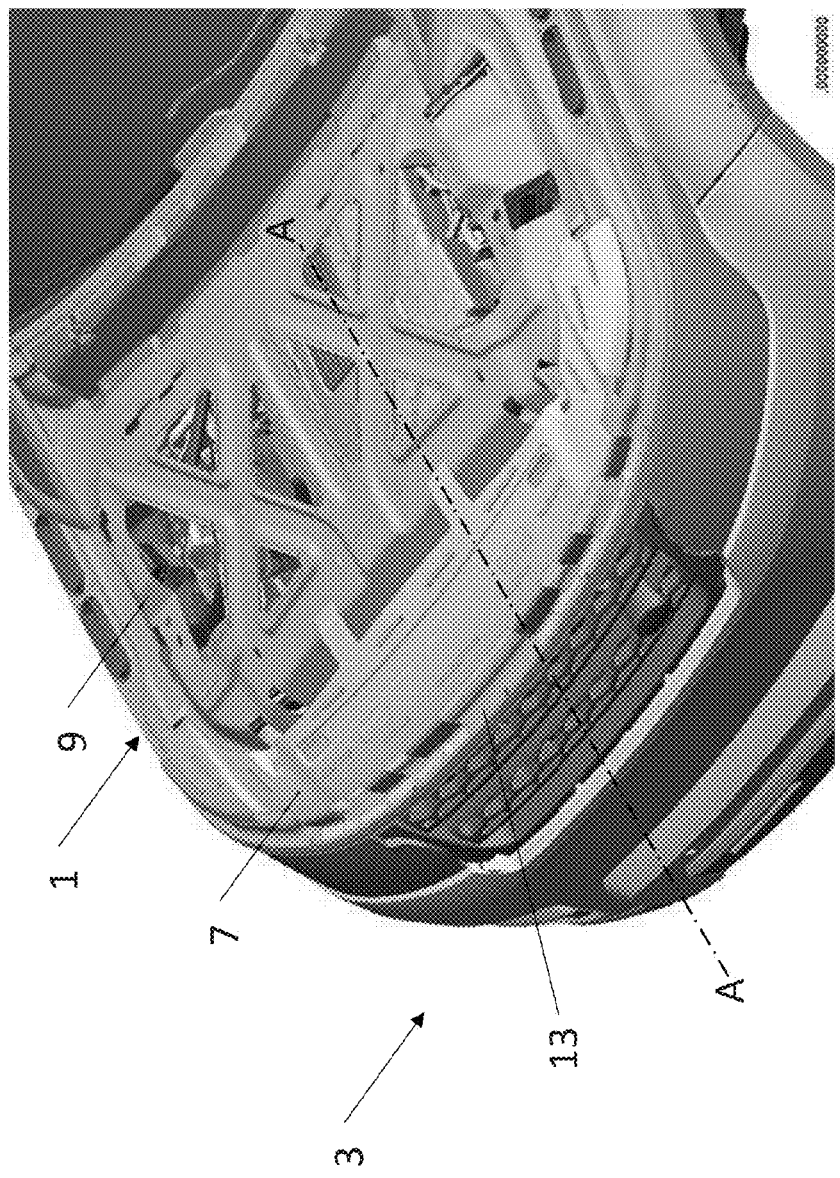
FIG. 1A shows a perspective view of a prior art arrangement of a motor vehicle bonnet assembly with the outer panel omitted.
Figure 1B:
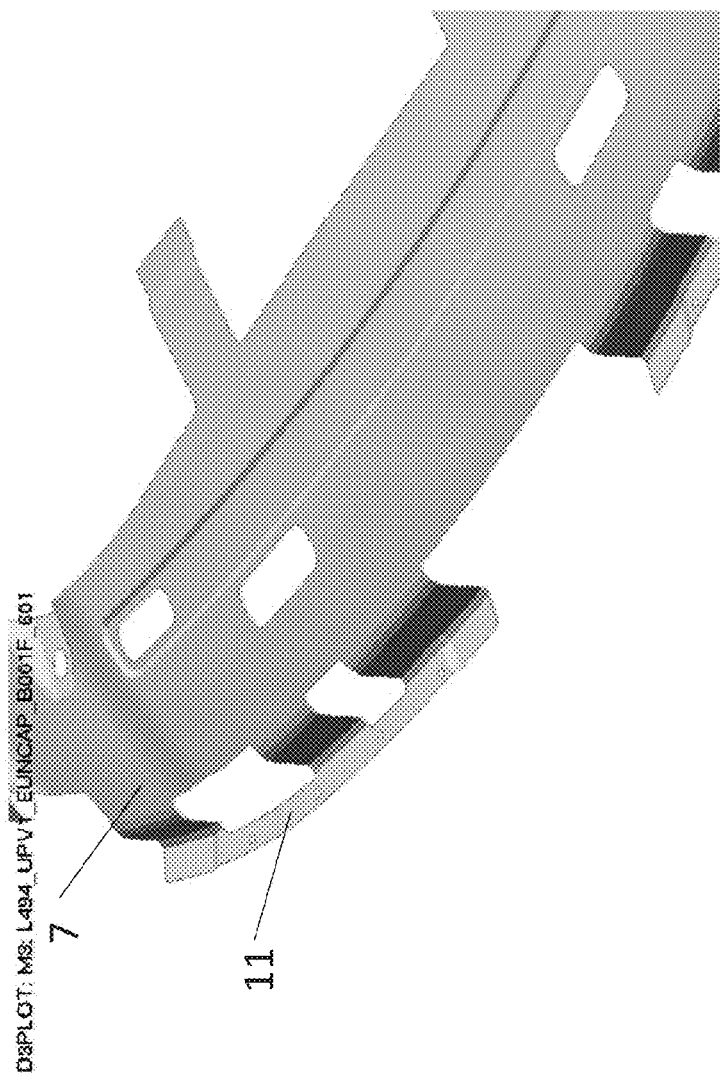
FIG. 1B shows a perspective view of a support member in the bonnet assembly shown in FIG. 1A.
Figure 2:
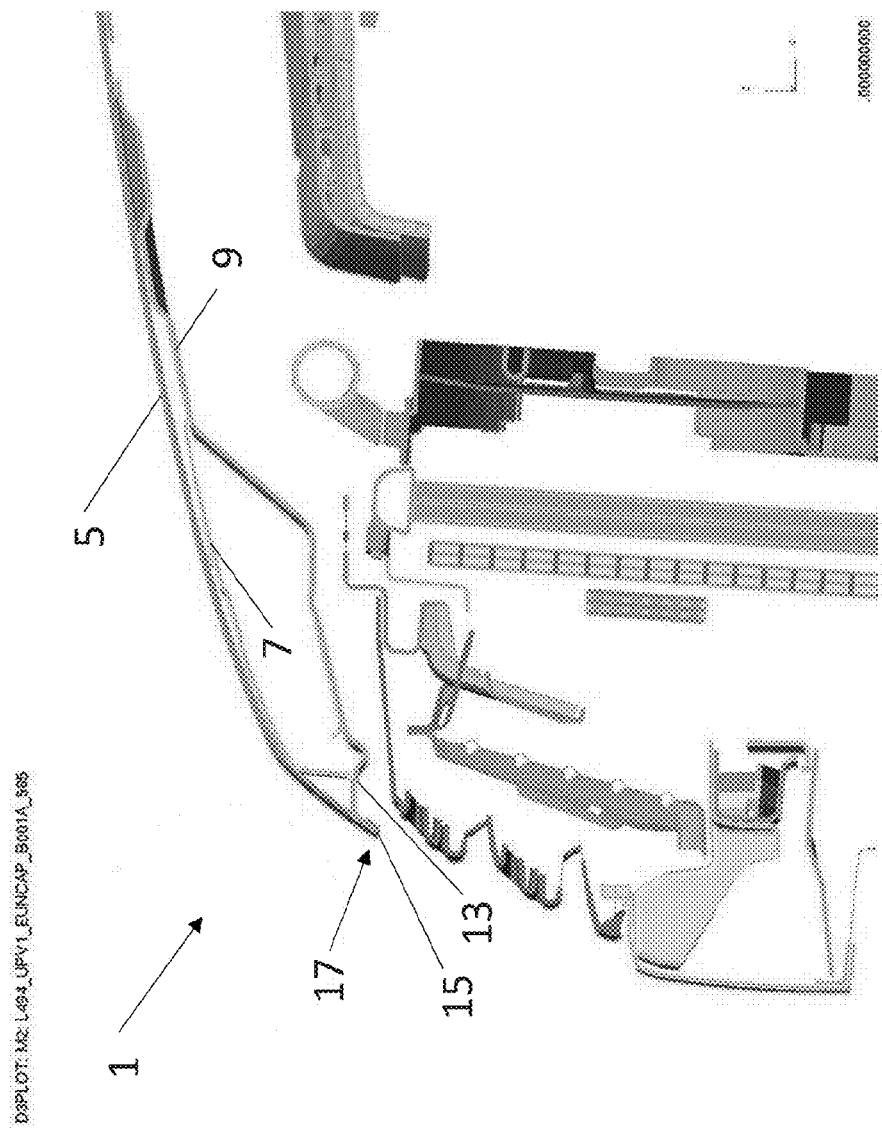
FIG. 2 shows a longitudinal section along A-A of FIG. 1A.
Figure 3A:
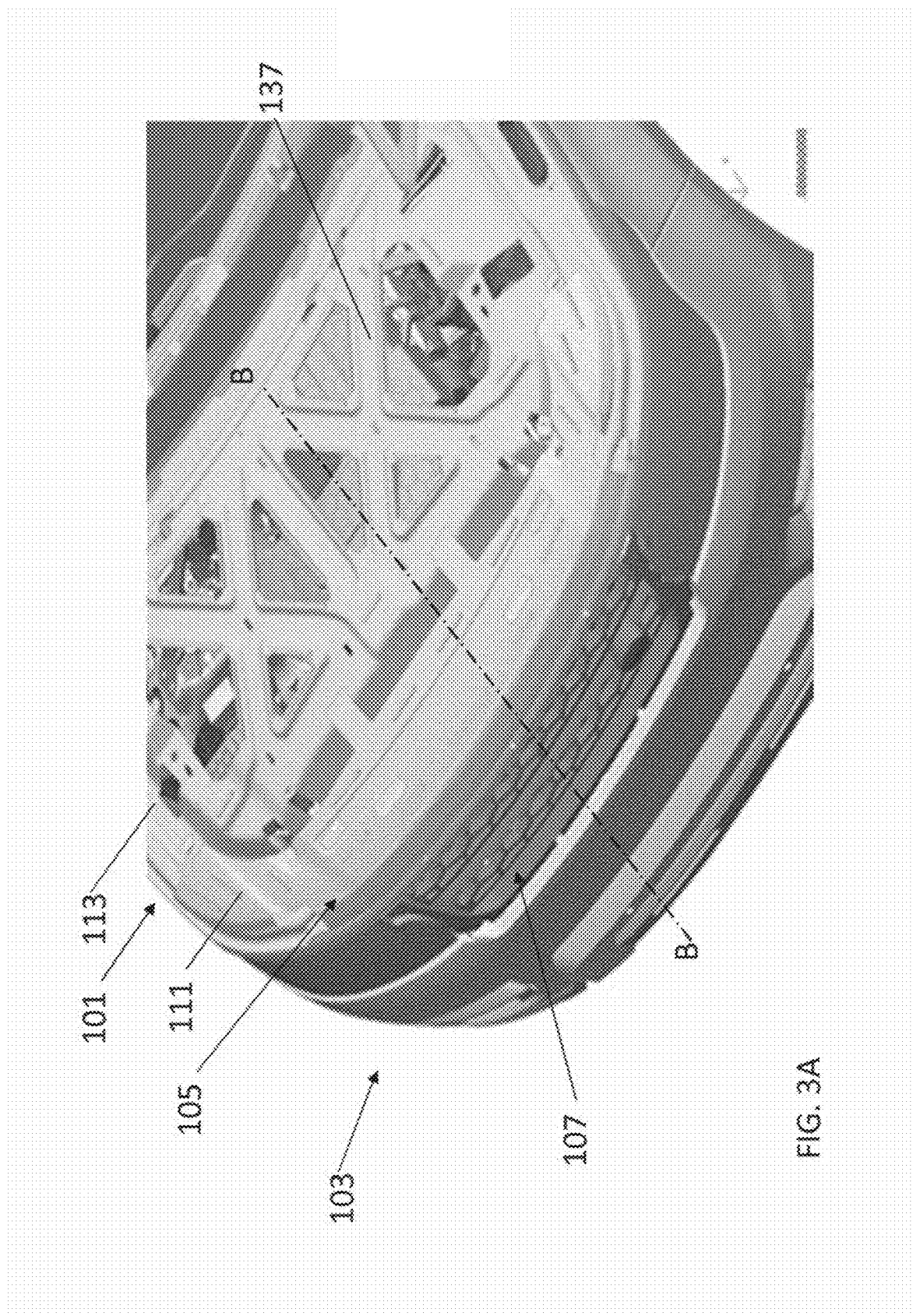
FIG. 3A shows a perspective view of an embodiment of a motor vehicle bonnet assembly in accordance with the present invention with the outer panel omitted.
Figure 3B:
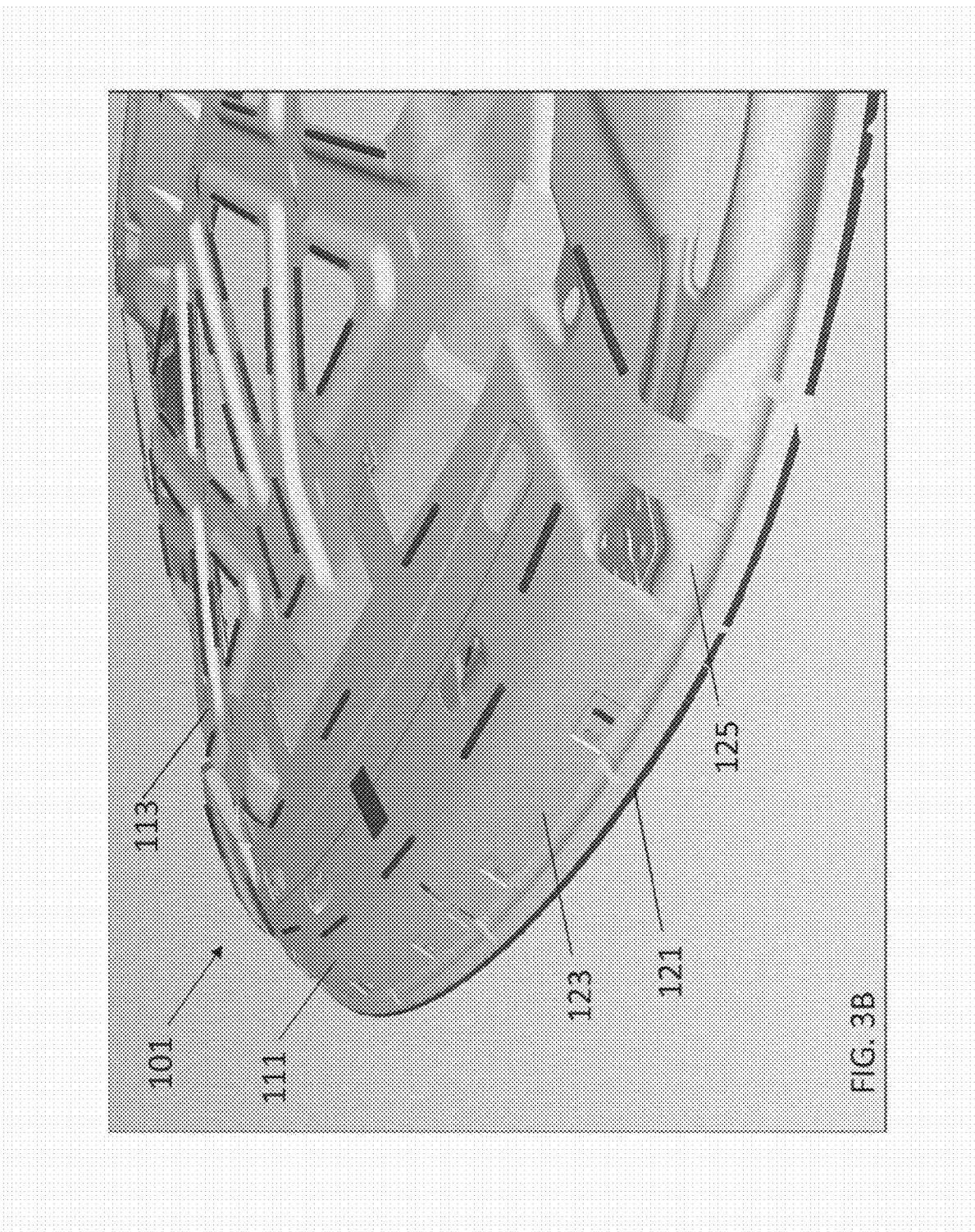
FIG. 3B shows a perspective view of the bonnet assembly with the outer surface panel omitted for clarity.
Figure 3C:
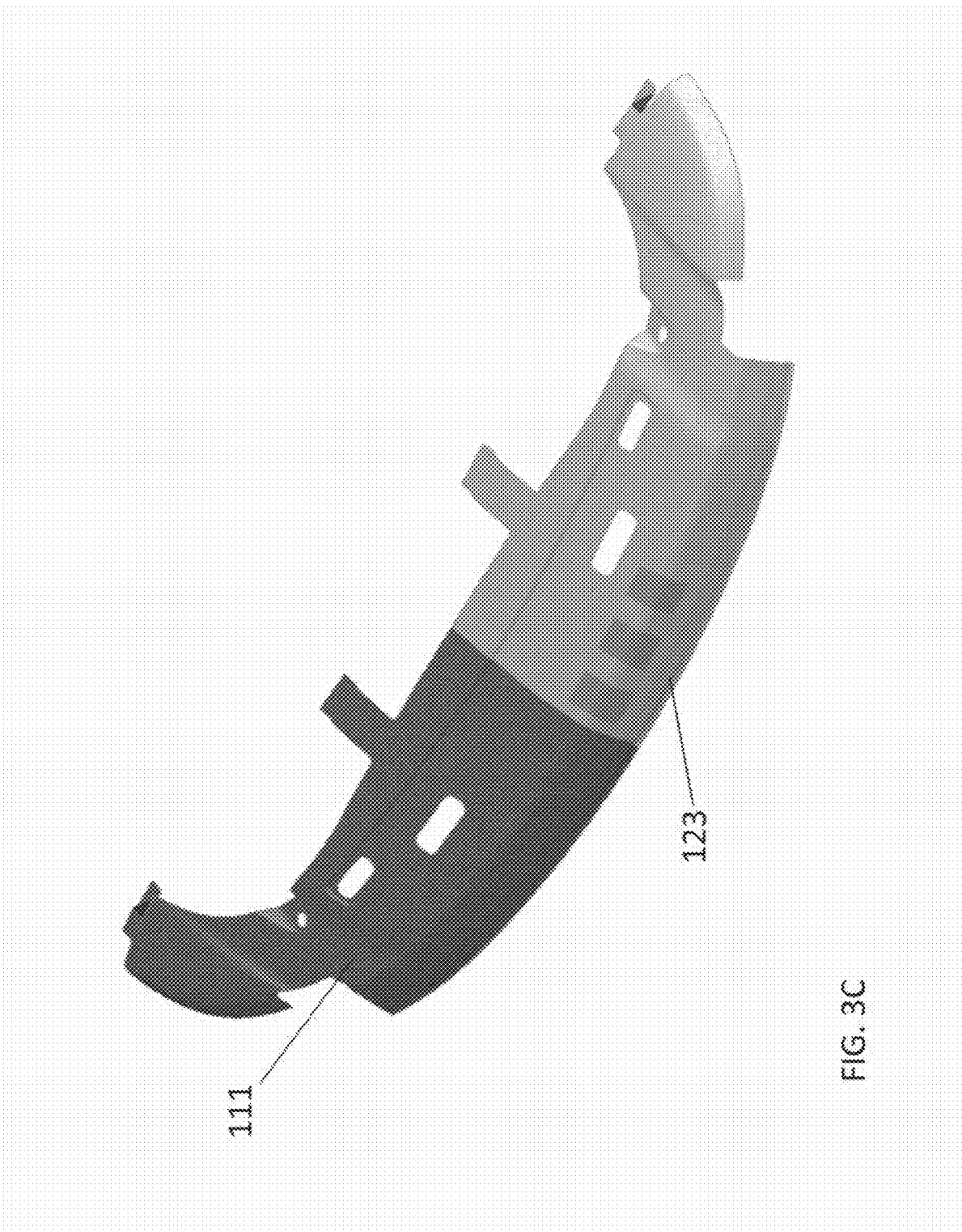
FIG. 3C shows a perspective view of a support member in the bonnet assembly according to the present invention.

An embodiment of a bonnet structure 101 in accordance with the present invention is shown in FIGS. 3A, 3B, 3C and 4. The bonnet 101 has a clamshell configuration and covers the engine compartment of a motor vehicle 103. A front section 105 of the bonnet 101 extends across the front of the vehicle 103 above a grille 107 and a pair of headlights.

A pair of hinges (not shown) connected to the rear of the bonnet 101 pivotally mount the bonnet 101 on the vehicle 103. A pair of latches (not shown) releasably engage the front of the bonnet 101 to secure it in a closed position. The hinges and latches provide anchor points for the bonnet 101.

The bonnet 101 comprises an outer surface panel 109, an intermediate support panel 111 and an inner panel 113. The outer surface panel 109, which is omitted from FIGS. 3A and 3B for clarity, defines an 'A' surface (i.e. the top surface) of the bonnet 101 and the inner panel 113 defines a 'B' surface (i.e. the bottom surface). The intermediate support panel 111 is positioned between the outer surface panel 109 and the inner panel 113. The outer surface panel 109, the intermediate support panel 111 and the inner panel 113 are made of aluminium, but the techniques described herein could be employed for panels made of other materials, such as steel or composites.

The outer surface panel 109 has a first edge flange 115 which is bent around a second edge flange 117 provided on the inner panel 113 to form a hem 119. An adhesive can be applied between the outer surface panel 109 and the inner panel 113 to seal the sandwiched layers in the hem 119. The hem 119 defines a leading edge 121 of the bonnet 101 and attaches the front of the inner panel 113 directly to the outer surface panel 109. As described in more detail below, the intermediate support panel 111 is mounted on the inner panel 113 and is only indirectly attached to the outer surface panel 109.

The intermediate support panel 111 has a first joining section 123; and the inner panel 113 has a second joining section 125. The first and second joining sections 123, 125 have complementary profiles and are placed in face-to-face contact with each other. A series of mechanical fasteners, such as rivets, join the first and second joining sections 123, 125 to mount the intermediate support panel 111 on the inner panel 113.

It will be appreciated that the joining technique used for joining components in the bonnet 101 can have a significant bearing on energy management and dissipation. The intermediate support panel 111 and the inner panel 113 can be joined by riveting, welding, bonding or mechanical fasteners. In the present embodiment, the intermediate support panel 111 and the inner panel 113 are made of aluminium and riveting or bonding techniques would typically be employed to join them. If the panels 111, 113 were made of steel, welding would typically be used. However, other techniques can be employed, as appropriate.

A Z-shaped step 127 is formed in the inner panel 113 to define the second edge flange 117 and the second joining section 125. The step 127 creates a recess 129 between the outer surface panel 109 and the inner panel 113 in the assembled bonnet 101 to accommodate the first joining section 123. The step 127 is formed such that the second joining section 125 is arranged substantially parallel to the outer surface panel 109. The first and second joining sections 123, 125 are profiled to substantially match the profile of the adjacent section of the outer surface panel 109. The complementary profiles of the respective surfaces result in the first and second joining sections 123, 125 and the outer surface panel 109 being arranged substantially parallel to each other in the bonnet 101.

The rear of the intermediate support panel 111 is releasably attached to the outer surface panel 109 by an anti-flutter adhesive. Similarly, an anti-flutter adhesive can be applied to releasably attach the inner panel 112 to the outer surface panel 109. The anti-flutter adhesive is non-loading carrying and will allow the panels 109, 111, 113 to separate under load. The outer surface panel 109 and the inner panel 113 thereby provide alternate load paths to the bonnet anchor points.

Figure 4:
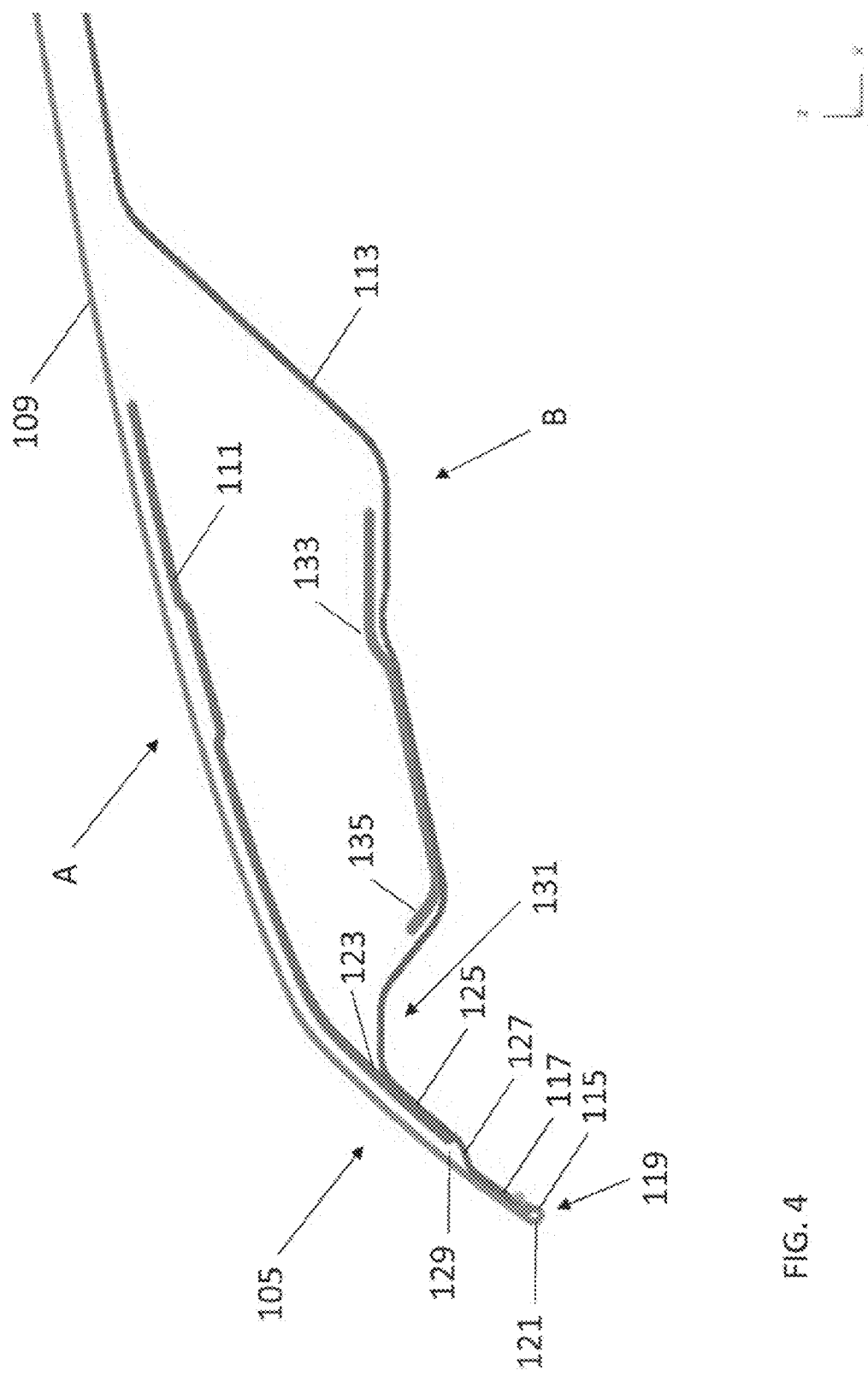
FIG. 4 shows a longitudinal section along B-B of FIG. 3A.

The first and second joining sections 123, 125 form an overlapping joint and are in face-to-face contact with each other. However, as shown in FIG. 4, a substantially uniform gap is formed between the intermediate support panel 111 and the outer surface panel 109. The anti-flutter adhesive can function as a spacer to maintain the gap between the outer surface panel 109 and the intermediate support panel 111.

The inner panel 113 does not follow the profile of the outer surface panel 109 beyond (i.e. inset from) the second joining section 125. Rather, the inner panel 113 diverges from the outer surface panel 109 and forms a concave section 131 in the 'B' surface of the bonnet 101 for accommodating tooling during the assembly process. Thus, inset from the second joining section 125, the inner panel 113 diverges away from the outer surface panel 109. A reinforcing panel 133 is mounted on an upper surface of the inner panel 113 and an upwardly directed flange 135 provides support for the concave section 131. The mid-section of the inner panel 113 forms a series of supporting cross-members 137 positioned proximal the underside of the outer surface panel 109.

The outer surface panel 109 and the inner panel 113 of the bonnet 101 provide alternate load paths to the anchor points. Moreover, the arrangement of the inner panel 113 and the intermediate support panel 111 in accordance with the present invention can provide improved uniformity of rigidity at least in the front section 105 of the bonnet 101.

In the event of an impact on the front section 105, the configuration of the bonnet 101 can control the rate and duration of any loading. After an initial impact, the bonnet 101 manages the dissipation of energy to the anchor points and on to the rest of the vehicle 103. Furthermore, at least in certain embodiments, rotation during the impact is managed due to the uniform rigidity across the front section 105 of the bonnet 101.

It will be appreciated that various changes and modifications can be made to the bonnet 101 described herein without departing from the spirit and scope of the present invention. For example, one or more apertures can be formed in the intermediate support panel 111 and/or the inner panel 113 to adjust the characteristics of the bonnet 101. Moreover, the outer surface panel 109 and the inner panel 113 could be joined using a range of techniques, including seaming, bonding or welding. Likewise, different construction techniques could be used to mount the intermediate support panel 111 on the inner panel 11.

Figure 5A:
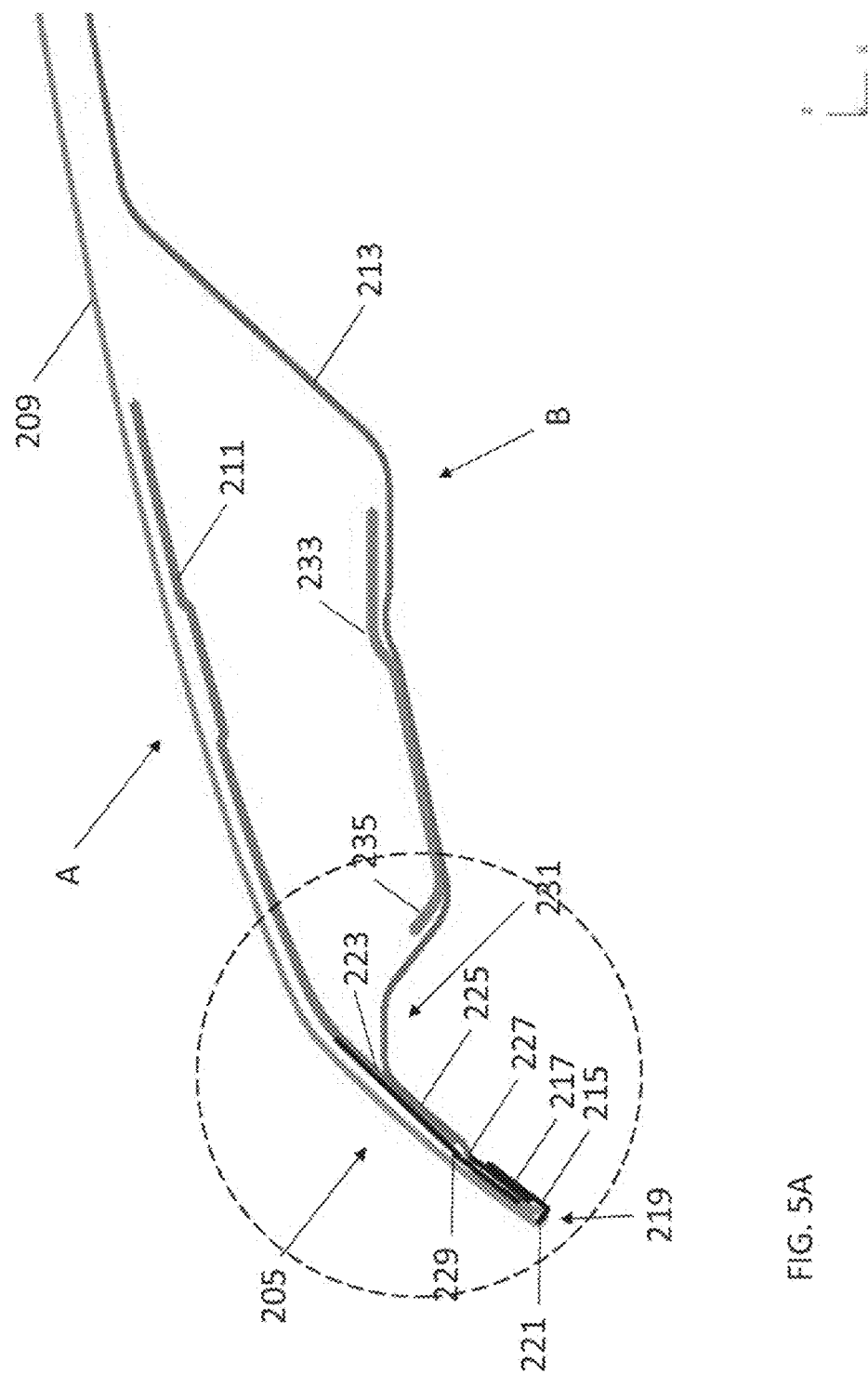

A bonnet structure 201 in accordance with a second embodiment of the present invention is shown in FIGS. 5A and 5B. The bonnet structure 201 has a similar configuration to the bonnet structure 101 according to the first embodiment described herein. Like reference numerals are used for like components, albeit incremented by 100 for clarity.

The bonnet structure 201 has a clamshell configuration and covers the engine compartment of a motor vehicle. A pair of hinges (not shown) connected to the rear of the bonnet 201 pivotally mount the bonnet 201 on the vehicle. A pair of latches (not shown) releasably engage the front of the bonnet 201 to secure it in a closed position. The hinges and latches provide anchor points for the bonnet 201.

As shown in FIG. 5A, the bonnet 201 comprises an outer surface panel 209, an intermediate support panel 211 and an inner panel 213. The outer surface panel 209 defines an 'A' surface (i.e. the top surface) of the bonnet 201 and the inner panel 213 defines a 'B' surface (i.e. the bottom surface). The intermediate support panel 211 is positioned between the outer surface panel 209 and the inner panel 213. As in the bonnet 101 according to the first embodiment of the present invention, the outer surface panel 209, the intermediate support panel 211 and the inner panel 213 are made of aluminium.

The outer surface panel 209 has a first edge flange 215 which is folded to form a hem 219, as shown in the enlarged view in FIG. 5B. The hem 219 is formed around the inner panel 213 and the intermediate support panel 211 to fixedly mount them both to the outer surface panel 209. To accommodate both the intermediate support panel 211 and the inner panel 213, the radius of the hem 219 is greater than that of the hem 119 according to the first embodiment. A first joining section 223 is defined along a transverse front edge of the intermediate support panel 211. A second edge flange 217, extending transversely across a front of the inner panel 213, forms a second joining section 225. The first and second joining sections 223, 225 have complementary profiles and are arranged in face-to-face contact with each other. Moreover, the first and second joining sections 223, 225 have a profile which substantially matches the profile of the outer surface panel 209. The hem 219 is formed around the first and second joining sections 223, 225 to join the intermediate support panel 211 and the inner panel 213. The intermediate support panel 211 and the inner panel 213 are mounted to the outer surface panel 201 by the hem 219. In the present arrangement, the hem 219 defines a leading edge 221 of the bonnet 201.

An adhesive can optionally be applied between the outer surface panel 209, the intermediate support panel 211 and the inner panel 213 to seat the hem 219 to inhibit the ingress of moisture. The inner panel 213 and the intermediate support panel 211 could optionally be joined to each other, for example by mechanical fastener(s) or adhesive, prior to forming the hem 219.

The intermediate support panel 211 at least substantially follows the profile of the outer surface panel 209. The inner panel 213 diverges from the outer surface panel 209 away from the hem 219. The first and second joining sections 223, 225 have profiles which at least substantially match that of the outer surface panel 209 and, set back from the leading edge 221 of the bonnet 201, the inner panel 213 diverges from the outer surface panel 209. In particular, at transverse fold line 239 is formed in the inner panel 213. The inner panel 213 thereby forms a concave section 231 in the 'B' surface of the bonnet 101 for accommodating tooling during the assembly process. A reinforcing panel 233 is mounted on an upper surface of the inner panel 213 and an upwardly directed flange 235 provides support for the concave section 231.

The bonnet 201 functions in a similar manner to the bonnet 101 according to the first embodiment of the present invention, in particular, the arrangement of the inner panel 213 and the intermediate support panel 211 can provide improved uniformity of rigidity in a front section 205 of the bonnet 201.

A modified arrangement of the bonnet structure 201 according to the second embodiment of the present invention is shown in FIG. 6. Like reference numerals are used for like components.

The intermediate support panel 211 extends inwardly from the leading edge 221 of the bonnet 201 substantially parallel to the outer surface panel 209. A fold line 243 is formed in the outer surface panel 209 to form the clamshell configuration, inset from the fold line 243, the intermediate support panel 211 diverges from the outer surface panel 209. A secondary panel 245 is mounted to an inner joining section 247 formed in the intermediate support panel 211. The secondary panel 245 extends towards a rear of the bonnet 201 (to the right in the sectional view shown in FIG. 6) substantially parallel to the outer surface panel 209.

The formation of the leading edge 221 of the bonnet structure is unchanged from the second embodiment. Specifically, the edge flange 215 is folded to form a hem 219 which joins the first and second joining sections 223, 225, thereby mounting the inner panel 213 and the intermediate support panel 211 to the outer surface panel 209.

The invention described herein has particular application in clamshell-type bonnets, but it will be appreciated that it can be embodied in other types of bonnets. Also, it is envisaged that the invention could be employed in other vehicle body components.

The invention claimed is:

1. A motor vehicle bonnet comprising:
   an outer surface panel and an inner panel, the outer surface panel being joined to the inner panel along an edge of said vehicle bonnet; and
   a support panel provided between the inner panel and the outer surface panel;
   wherein the bonnet comprises a front section, the front section being defined between said edge of the vehicle bonnet and a fold line in the outer surface panel;
   wherein the support panel comprises a first joining section and the inner panel comprises a second joining section, the first joining section and the second joining section having complementary profiles which substantially match the profile of an adjacent section of the outer surface panel;
   wherein, inset from said second joining section, the inner panel diverges away from the outer surface panel and the profile of the support panel at least substantially matches the profile of the outer surface panel between the second joining section and the fold line in the outer surface panel.

2. A motor vehicle bonnet as claimed in claim 1, wherein the first joining section and the second joining section are disposed adjacent to the edge of the vehicle bonnet.

3. A motor vehicle bonnet as claimed in claim 1, wherein the outer surface panel forms a hem folded over said first and second joining sections, the inner panel and the support panel being fixedly retained by said hem.

4. A motor vehicle bonnet as claimed in claim 1, wherein the outer surface panel forms a hem folded over said inner panel, the first and second joining sections being inset from said hem.

5. A motor vehicle bonnet as claimed in claim 1, wherein the inner panel comprises a z-shaped step for receiving the first joining section.

6. A motor vehicle bonnet as claimed in claim 1, wherein the support panel is releasably coupled to the inner panel and/or the outer surface panel remote from said first joining section.

7. A motor vehicle bonnet as claimed in claim 1, wherein the inner panel comprises a concave section adjacent the support panel.

8. A motor vehicle bonnet as claimed in claim 7, wherein a reinforcing panel is provided on the inner panel, the reinforcing panel overlying at least a portion of said concave region of the inner panel.

9. A motor vehicle bonnet as claimed in claim 1, wherein the bonnet is a clamshell vehicle bonnet.

10. A method of assembling a motor vehicle bonnet comprising an outer surface panel, a support panel and an inner panel; the method comprising:
    coupling the support panel to the inner panel; and coupling the inner panel to the outer surface panel;
wherein the bonnet comprises a front section, the front section being defined between an edge of the vehicle bonnet and a fold line in the outer surface panel;
wherein the support panel comprises a first joining section for joining the support panel to a second joining section of the inner panel, the first joining section and the second joining section having complementary profiles which substantially matches the profile of an adjacent section of the outer surface panel;
wherein, inset from said second joining section, the inner panel diverges away from the outer surface panel and the profile of the support panel at least substantially matches the profile of the outer surface panel between the second joining section and the fold line in the outer surface panel.

11. A method as claimed in claim 10, further comprising the step of forming a z-shaped step in the inner panel for receiving the first joining section.

12. A method as claimed in claim 10, wherein the support panel is coupled to the inner panel before the inner panel is coupled to the outer surface panel.

13. A method as claimed in claim 10, wherein the inner panel is coupled to the support panel by forming a hem along an edge thereof.

14. A vehicle comprising a bonnet, the bonnet comprising:
an outer surface panel and an inner panel, the outer surface panel being joined to the inner panel along an edge of the bonnet; and
a support panel provided between the inner panel and the outer surface panel;
wherein the bonnet comprises a front section, the front section being defined between said edge of the vehicle bonnet and a fold line in the outer surface panel;
wherein the support panel comprises a first joining section and the inner panel comprises a second joining section, the first joining section and the second joining section having complementary profiles which substantially match the profile of an adjacent section of the outer surface panel;
wherein, inset from said second joining section, the inner panel diverges away from the outer surface panel and the profile of the support panel at least substantially matches the profile of the outer surface panel between the second joining section and the fold line in the outer surface panel.

15. A vehicle as claimed in claim 14, wherein a substantially uniform gap is maintained between the support panel and the outer surface panel.

16. A motor vehicle bonnet as claimed in claim 9, wherein, inset from the fold line, the support panel diverges from the outer surface panel.

17. A motor vehicle bonnet as claimed in claim 16, comprising a secondary panel mounted to an inner joining section of the support panel.

18. A motor vehicle bonnet as claimed in claim 17, wherein the secondary panel extends towards a rear of the bonnet substantially parallel to the outer surface panel.

19. A motor vehicle bonnet as claimed in claim 1, wherein a substantially uniform gap is maintained between the support panel and the outer surface panel.

* * * * *